(12) United States Patent
Zhao et al.

(10) Patent No.: US 9,343,934 B2
(45) Date of Patent: May 17, 2016

(54) ELECTRIC MOTOR

(75) Inventors: Jian Zhao, Shenzhen (CN); Yue Li, Hong Kong (CN); Mao Xiong Jiang, Shenzhen (CN); Chui You Zhou, Hong Kong (CN); Yong Wang, Shenzhen (CN); Ya Ming Zhang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 155 days.

(21) Appl. No.: 13/590,373

(22) Filed: Aug. 21, 2012

(65) Prior Publication Data

US 2013/0049493 A1    Feb. 28, 2013

(30) Foreign Application Priority Data

Aug. 22, 2011    (CN) .......................... 2011 1 0241315

(51) Int. Cl.
   *H02K 1/27*          (2006.01)
   *H02K 21/12*        (2006.01)
   *H02K 1/28*          (2006.01)

(52) U.S. Cl.
   CPC .............. *H02K 1/2773* (2013.01); *H02K 1/276* (2013.01); *H02K 1/28* (2013.01); *H02K 21/12* (2013.01)

(58) Field of Classification Search
   CPC ....... H02K 1/28; H02K 1/2773; H02K 1/276; H02K 21/12
   USPC ....................................... 310/156.01–156.84
   See application file for complete search history.

(56) References Cited

U.S. PATENT DOCUMENTS

| | | | | |
|---|---|---|---|---|
| 3,072,813 A * | 1/1963 | Donselaar | ............ | H02K 1/2773 310/156.55 |
| 3,979,821 A * | 9/1976 | Noodleman | ......... | H02K 13/006 148/108 |
| 4,445,062 A * | 4/1984 | Glaser | .................. | H02K 1/2773 310/156.59 |
| 5,010,266 A * | 4/1991 | Uchida | ..................... | 310/156.22 |
| 5,091,668 A * | 2/1992 | Cuenot | ................ | H02K 1/2773 310/156.61 |
| 5,162,686 A * | 11/1992 | Royer | ....................... | 310/156.59 |
| 6,603,232 B2 * | 8/2003 | Van Dine | ............. | H02K 1/2773 310/152 |
| 7,148,598 B2 | 12/2006 | Ionel et al. | | |
| 8,004,140 B2 * | 8/2011 | Alexander | ........... | H02K 1/2773 310/156.48 |
| 8,334,667 B2 * | 12/2012 | Sakai et al. | .................... | 318/494 |
| 2006/0255679 A1 * | 11/2006 | Dine et al. | ................ | 310/156.55 |
| 2008/0024018 A1 * | 1/2008 | Rignault | ............... | H02K 1/2773 310/424 |
| 2012/0181880 A1 | 7/2012 | Zhao et al. | | |

* cited by examiner

*Primary Examiner* — Joshua Benitez-Rosario
*Assistant Examiner* — Leda Pham
(74) *Attorney, Agent, or Firm* — Muncy, Geissler, Olds & Lowe, P.C.

(57) ABSTRACT

An electric motor has a wound stator and a permanent magnet rotor. The rotor includes a shaft, a hub fixed on the shaft, a plurality of rotor core segments and magnets fixed around the hub. The rotor core segment includes at least two rotor blocks inwardly extending from the innermost portion thereof. The hub includes a plurality of hub blocks equidistantly and outwardly extending from the outer surface thereof. The rotor blocks of each rotor core segment engage with at least one hub block to fix the rotor core segment to the hub. The number of rotor blocks is greater than the number of hub blocks.

18 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 201110241315.1 filed in The People's Republic of China on Aug. 22, 2011.

FIELD OF THE INVENTION

The present invention relates to electric motors and, in particular, to a permanent magnet rotor for an electric motor.

BACKGROUND OF THE INVENTION

Usually, a permanent magnet, brushless direct current (PM BLDC) motor includes a stator and a rotor. The rotor has a number of permanent magnet installed thereon. The stator includes a stator core with windings wound on the stator core. The windings generate a magnetic field which interacts with the permanent magnets to rotate the rotor. The rotor may have a structure shown in USA patent publication No. US2012-0181880A1 assigned to the same assignee. The rotor includes a number of rotor segments. Each rotor segment has a dovetail shaped end, which engages a dovetail shaped slot formed in a hub fixed to the shaft. However, it was found that the stress concentration on the edges of the dovetail shaped slots is relatively great, which may lead to malfunction of the rotor and failure of the motor.

SUMMARY OF THE INVENTION

Thus there is a desire for a rotor of the above construction with less stress on the connection between the hub and the rotor segments.

Accordingly, in one aspect thereof, the present invention provides a rotor for an electric motor, comprising: a shaft; a hub fixed to the shaft and comprising a plurality of hub blocks equidistantly and outwardly extending from an outer surface thereof; a plurality of rotor core segments fixed to the hub; and a plurality of magnets fixed between respective adjacent rotor core segments, wherein each rotor core segment comprises at least two rotor blocks inwardly extending from a radially innermost portion thereof, the rotor blocks of each rotor core segment engage with at least one hub block to fix the rotor core segment to the hub, the number of rotor blocks being greater than the number of hub blocks.

Preferably, each rotor core segment comprises two rotor blocks that are spaced apart in the circumferential direction of the shaft and form a space there between, the hub block being form locked within the space between the two rotor blocks.

Preferably, each space formed between the two rotor blocks of the core segments are dovetail shaped and the hub blocks are correspondingly dovetail shaped.

Preferably, the two rotor blocks of each rotor core segment contact respective adjacent magnets.

Preferably, the hub is fixed to the shaft and the rotor core segments by an inserting molding process.

Preferably, each rotor core segment comprises two tongues respectively formed on circumferentially opposite sides of the radially outmost portion thereof, extending in the circumferential direction of the rotor; the radially inner end of each magnet contacts the radially outer surface of the hub and the radially outer end of each magnet contacts the tongues of two adjacent rotor core segments.

Preferably, the radial cross section of each magnet is substantially trapezoidal, and the thickness of each magnet in the circumferential direction of the shaft increases from the radially inner end to the radially outer end thereof.

Preferably, the radially innermost end of each magnet is closer to the shaft than the radially innermost end of each rotor core segment.

Preferably, two covers are disposed at respective axial ends of the rotor core segments.

Preferably, the hub is formed of a material with a relatively high magnetic resistance.

According to a second aspect thereof, the present invention provides an electric motor comprising: a stator having a stator core with a plurality of teeth and windings wound on the teeth; and a rotor installed in the stator, the rotor comprising a shaft, a hub fixed on the shaft, a plurality of rotor core segments and magnets alternatively fixed around the hub; wherein each rotor core segment comprises at least two rotor blocks inwardly extending from the radially innermost portion thereof, the hub comprises a plurality of hub blocks equidistantly and outwardly extending from the outer surface thereof, the rotor blocks of each rotor core segment engage with at least one hub block to fix the rotor core segment to the hub; and the number of rotor blocks is greater than the number of hub blocks.

Preferably, the stator comprises 12 teeth and the rotor comprises 10 rotor core segments.

Preferably, each rotor core segment comprises two rotor blocks that are spaced apart in the circumferential direction of the shaft and form a space there between, the hub block being form locked within the space between the two rotor blocks.

Preferably, each space formed between the two rotor blocks of the core segments are dovetail shaped and the hub blocks are correspondingly dovetail shaped.

Preferably, the two rotor blocks of each rotor core segment contact respective adjacent magnets.

Preferably, the hub is fixed to the shaft and the rotor core segments by an inserting molding process.

Preferably, each rotor core segment comprises two tongues respectively formed on circumferentially opposite sides of the radially outmost portion thereof, extending in the circumferential direction of the rotor; the radially inner end of each magnet contacts the radially outer surface of the hub and the radially outer end of each magnet contacts the tongues of two adjacent rotor core segments.

Preferably, the radial cross section of each magnet is substantially trapezoidal, and the thickness of each magnet in the circumferential direction of the shaft increases from the radially inner end to the radially outer end thereof.

Preferably, the radially innermost end of each magnet is closer to the shaft than the radially innermost end of each rotor core segment.

Preferably, two covers are disposed at respective axial ends of the rotor core segments.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
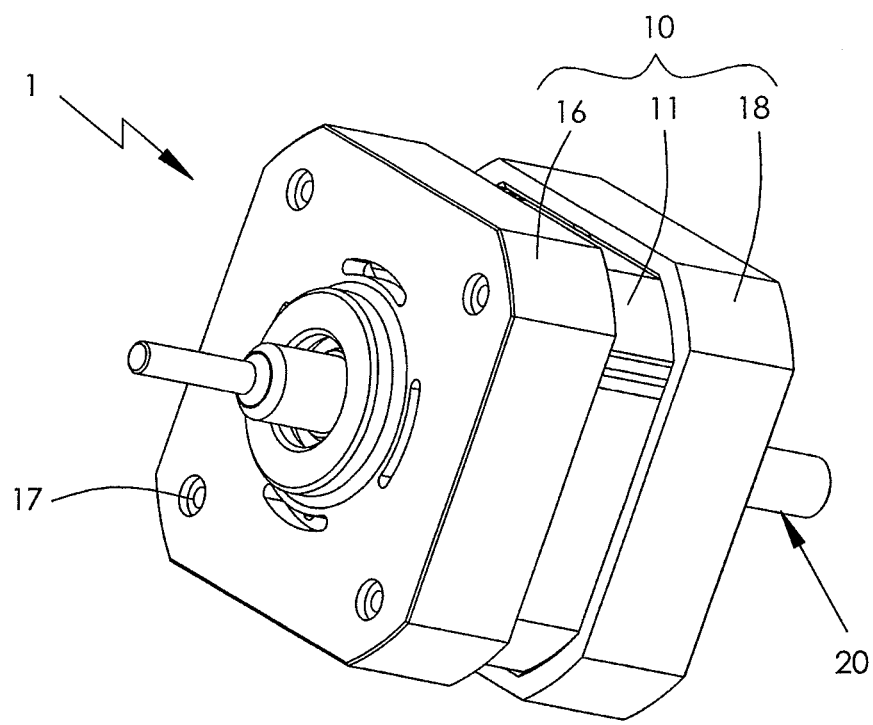
FIG. 1 is a view of an electric motor in accordance with an embodiment of the present invention, the motor includes a stator core, windings, two end caps and a rotor.
Figure 2:
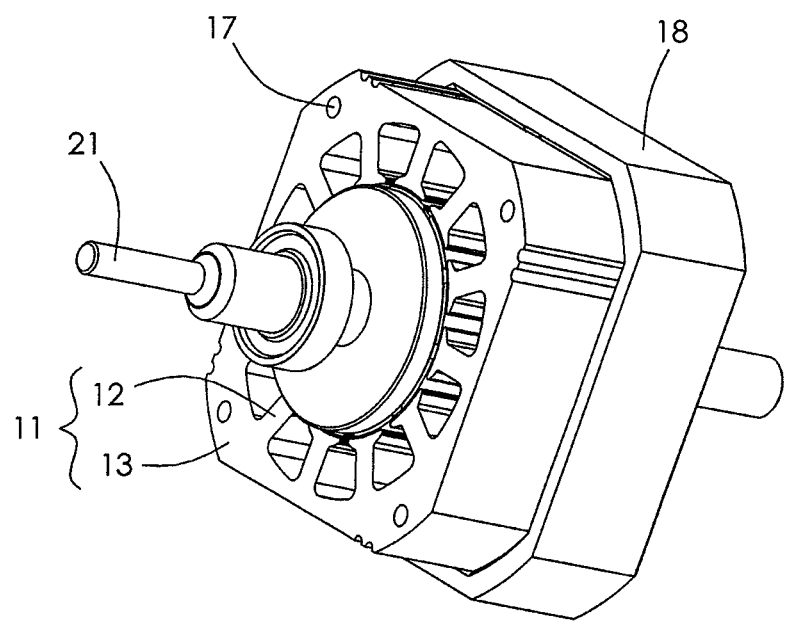
FIG. 2 illustrates the motor of FIG. 1 with one end cap and windings removed.

Referring to FIGS. 1 and 2, an electric motor 1, according to a preferred embodiment of the present invention, includes a stator 10 and a rotor 20 rotatably disposed within the stator 10. The stator 10 includes a stator core 11, windings (not shown) wound around the stator core 11, and two end caps 16 and 18 disposed on respective axial ends of the stator core 11. The stator core 10 is generally made up of a number of laminations stacked together. The core comprises a substantially square yoke 13 and a number of salient teeth 12, twelve teeth in the present embodiment, extending inwardly from the yoke 13. The windings include coils wound about the teeth, preferable one coil per tooth and one tooth per coil, commonly known as a concentrated winding. The end caps 16, 18 and the stator core 11 defines a number of apertures (holes) 17 at the peripheral portion thereof that extend there through in a direction that is substantially parallel to the rotational axis of the motor 1. Screws (not shown) fasten the end caps 16, 18 to the stator core 11 by passing through the apertures 17.

Figure 3:
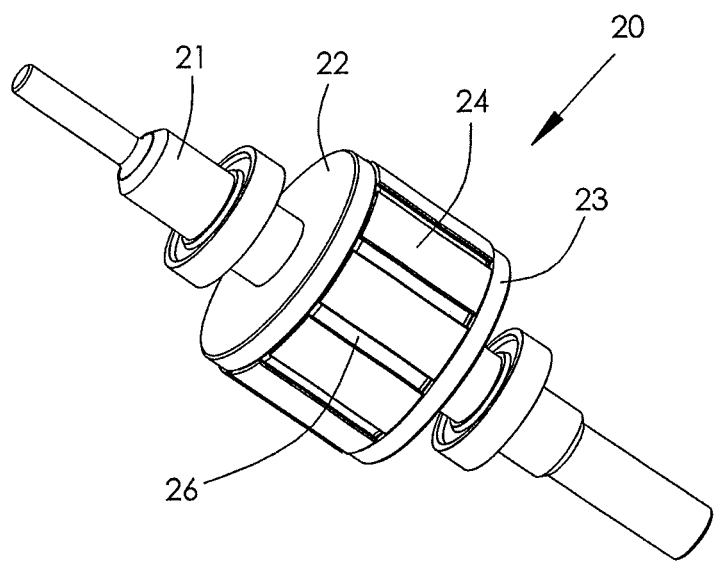
FIG. 3 illustrates a rotor of the motor of FIG. 1, the rotor includes two covers.
Figure 4:
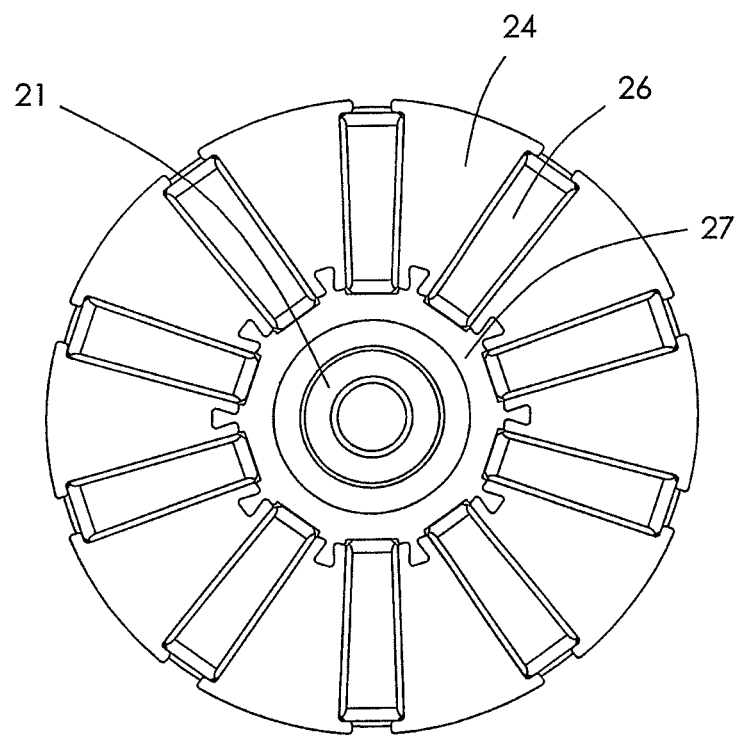
FIG. 4 is an end view of the rotor of FIG. 3, with the covers removed.
Figure 5:
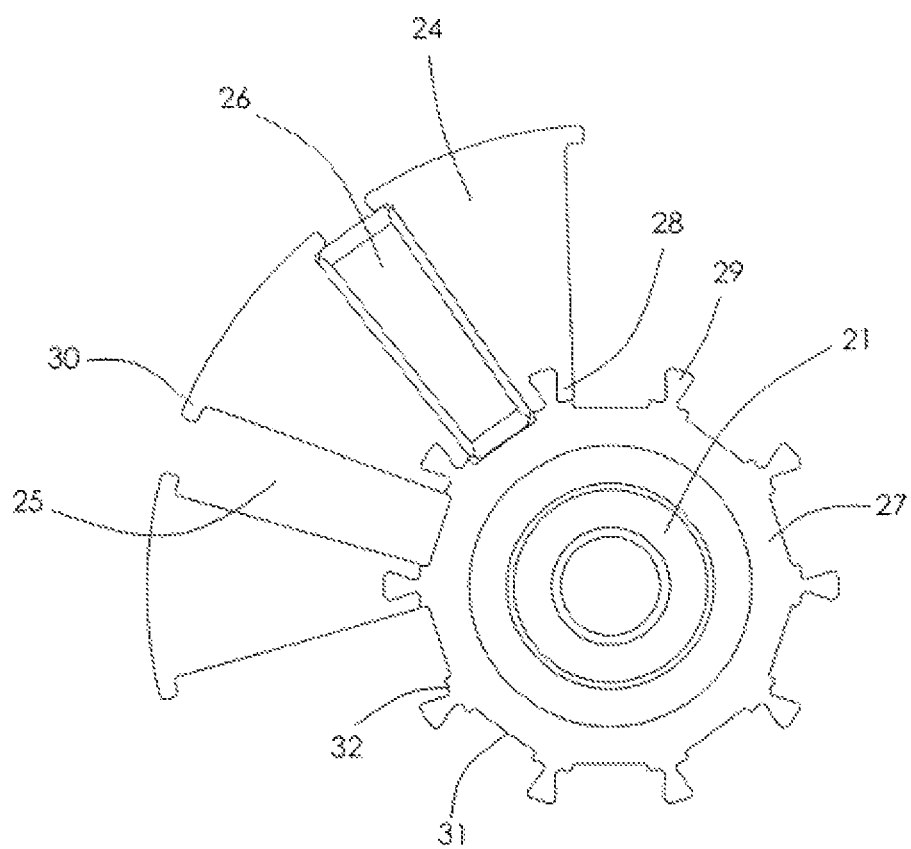
FIG. 5 is an enlarged end view of a portion the rotor of FIG. 4.

Referring to FIGS. 3 to 5, the rotor 20 of the preferred embodiment includes a shaft 21, a substantially polygonal hub 27 coaxially fixed to the shaft 21, and ten rotor core segments 24 and ten permanent magnets 26 alternately arranged around the hub 27. The hub 27 includes a number of hub blocks 29 equidistantly and outwardly extending from the outer surface of the hub. Each rotor core segment 24 includes at least two rotor blocks 28 inwardly extending from the innermost portion thereof. The hub block 29 and the space between the adjacent rotor blocks 28 of the same rotor core segment are both substantially dovetail or wedge shaped. Of course, the hub blocks 29 and the spaces may be of different shapes, such as circular, if desired. The rotor blocks 28 of each rotor core segment 24 engage with at least one hub block 29. In the preferred embodiment two rotor blocks 28 engage with one hub block 29 to fix the rotor core segment 24 to the hub 27. The rotor core segments 24 are arranged to define radially extending slots 25 that are spaced from one another around the shaft 21. The magnets 26 are polarized substantially in the circumferential direction of the shaft 21 and are received and retained in corresponding slots 25, with each rotor block 28 contacting an adjacent magnet 26. The rotor core segments 24 concentrate the magnetic flux generated by the adjacent magnets 26. This structure of the magnetic circuit increases the output torque of the motor.

In the present embodiment, adjacent rotor core segments 24 are separated from each other, the rotor core segments 24 and the magnets 26 are radially spaced from the shaft 21 by the hub 27. The hub has high magnetic resistance, thus reducing the flux of magnet flux to the shaft 21. Thus, magnet flux leakage is minimized and magnets 26 made of ferrite may be used. Compared to the structure describe in US2012- 0181880A1, it is found that the stress concentration on the hub blocks is relatively small, which leads to a longer life of the rotor 20.

Preferably, as shown in FIG. 3, the rotor 20 further includes a pair of covers 22, 23 disposed at respective axial ends of the rotor core segments 22 to minimized magnetic flux leakage. The hub 27 and the two covers 22, 23 can be attached to the shaft 21 by injection molding.

Preferably, as shown in FIG. 4, the radial cross section of the magnet 26 is substantially trapezoidal, and the thickness of the magnet 26 measured in the circumferential direction of the shaft 21 increases from the radially inner end to the radially outer end thereof. It is found that this structure of the magnet 26 is able to increase the output torque of the motor.

Preferably, as shown in FIG. 5, two tongues 30 are respectively formed on opposite sides of the radially outmost portion of each rotor core segment 24, extending in the circumferential direction of the rotor 20. The radially inner end of the magnet 26 contacts the outer surface of the hub 21 between adjacent rotor blocks 28, while the radially outer end of the magnet 26 abuts against the tongues 30. The tongues 30 aid in retaining the magnets 26 and inhibit movement of the magnets 26 in a radially outward direction.

Preferably, as shown in FIG. 5, the radially innermost end of the magnets 26 is in contact with the outer surface 31 of the hub 27 and closer to the shaft 21 than the radially innermost end of the rotor blocks 28. An engaging interface is formed between the radially inner most end of each rotor block 28 and a radially locating surface 32 of a corresponding hub block 29. The outer surface 31 of the hub 27 is closer to the shaft 21 than the engaging interface. As such, magnetic flux will not easily pass between innermost ends of adjacent rotor core segments 24 and therefore the magnet flux leakage is minimized.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A rotor for an electric motor, comprising:
   a shaft;
   a monolithic hub fixed to the shaft and comprising a plurality of hub blocks equidistantly and outwardly extending from an outer surface thereof;
   a plurality of rotor core segments fixed to the hub; and
   a plurality of magnets fixed between respective adjacent rotor core segments,
   wherein each rotor core segment comprises at least two rotor blocks inwardly extending from a radially innermost portion thereof, the rotor blocks of each rotor core segment engage with at least one hub block to fix the rotor core segment to the hub, the number of rotor blocks being greater than the number of hub blocks, the radially innermost end of each magnet being in contact with the outer surface of the hub and being closer to the shaft at a point adjacent the rotor block than the radially innermost end of each rotor block,
   wherein an engaging interface is formed between the radially inner most end of each rotor block and a radially locating surface of a corresponding hub block, the radially locating surface of the hub block located outside of the outer surface of the hub, the outer surface of the hub bein closer to the shaft at a point adjacent the engaging interface than the engaging interface.

2. The rotor of claim 1, wherein each rotor core segment comprises two rotor blocks that are spaced apart in the circumferential direction of the shaft and form a space there between, the hub block being form locked within the space between the two rotor blocks.

3. The rotor of claim 2, wherein each space formed between the two rotor blocks of the core segments are dovetail shaped and the hub blocks are correspondingly dovetail shaped.

4. The rotor of claim 2, wherein the two rotor blocks of each rotor core segment contact respective adjacent magnets.

5. The rotor of claim 1, wherein the hub is fixed to the shaft and the rotor core segments by an inserting molding process.

6. The rotor of claim 1, wherein each rotor core segment comprises two tongues respectively formed on circumferentially opposite sides of the radially outmost portion thereof, extending in the circumferential direction of the rotor; the radially inner end of each magnet contacts the radially outer surface of the hub and the radially outer end of each magnet contacts the tongues of two adjacent rotor core segments.

7. The rotor of claim 1, wherein the radial cross section of each magnet is substantially trapezoidal, and the thickness of each magnet in the circumferential direction of the shaft gradually increases from the radially inner end to the radially outer end thereof.

8. The rotor of claim 1 further comprising two covers disposed at respective axial ends of the rotor core segments.

9. The rotor of claim 1, wherein the hub is formed of a material with a magnetic resistance for reducing magnetic flux to the shaft.

10. An electric motor comprising:
a stator having a stator core with a plurality of teeth and windings wound on the teeth; and
a rotor installed in the stator, the rotor comprising a shaft, a monolithic hub fixed on the shaft, a plurality of rotor core segments and magnets alternatively fixed around the hub;
wherein each rotor core segment comprises at least two rotor blocks inwardly extending from the radially innermost portion thereof, the hub comprises a plurality of hub blocks equidistantly and outwardly extending from the outer surface thereof, the rotor blocks of each rotor core segment engage with at least one hub block to fix the rotor core segment to the hub; and the number of rotor blocks is greater than the number of hub blocks, the radially innermost end of each magnet being in contact with the outer surface of the hub and being closer to the shaft at a point adjacent the rotor block than the radially innermost end of each rotor block,
wherein an engaging interface is formed between the radially inner most end of each rotor block and a radially locating surface of a corresponding hub block, the radially locating surface of the hub block located outside of the outer surface of the hub, the outer surface of the hub being closer to the shaft at a point adjacent the engaging interface than the engaging interface.

11. The motor of claim 10, wherein the stator comprises 12 teeth and the rotor comprises 10 rotor core segments.

12. The motor of claim 10, wherein each rotor core segment comprises two rotor blocks that are spaced apart in the circumferential direction of the shaft and form a space there between, the hub block being form locked within the space between the two rotor blocks.

13. The motor of claim 12, wherein each space formed between the two rotor blocks of the core segments are dovetail shaped and the hub blocks are correspondingly dovetail shaped.

14. The motor of claim 12, wherein the two rotor blocks of each rotor core segment contact respective adjacent magnets.

15. The motor of claim 10, wherein the hub is fixed to the shaft and the rotor core segments by an inserting molding process.

16. The motor of claim 10, wherein each rotor core segment comprises two tongues respectively formed on circumferentially opposite sides of the radially outmost portion thereof, extending in the circumferential direction of the rotor; the radially inner end of each magnet contacts the radially outer surface of the hub and the radially outer end of each magnet contacts the tongues of two adjacent rotor core segments.

17. The motor of claim 10, wherein the radial cross section of each magnet is substantially trapezoidal, and the thickness of each magnet in the circumferential direction of the shaft increases from the radially inner end to the radially outer end thereof.

18. The motor of claim 10, wherein the hub is formed of a material with a magnetic resistance for reducing magnetic flux to the shaft.

* * * * *